3,595,751
PROCESS FOR PRODUCING L-LYSINE
Kiyoshi Nakayama, Sagamihara-shi, and Hiroshi Hagino, Hachioji-shi, Japan, assignors to Kyowa Hakko Kogyo Co., Ltd., Tokyo, Japan
No Drawing. Filed Mar. 13, 1969, Ser. No. 807,088
Claims priority, application Japan, Mar. 15, 1968, 43/16,458
Int. Cl. C12d 13/06
U.S. Cl. 195—49
12 Claims

ABSTRACT OF THE DISCLOSURE

A process for producing L-lysine by fermentation which comprises culturing an L-lysine-producing microorganism under aerobic conditions in an aqueous nutrient medium containing ethyl alcohol as the main carbon-containing substrate. Genera of microorganisms employed include Corynebacterium, Brevibacterium, Arthrobacter, Bacillus and Nocardia.

This invention relates to a process for producing L-lysine. More particularly, it relates to a process for the production of L-lysine by fermentation. Even more particularly, the invention relates to a process for producing L-lysine by fermentation using ethyl alcohol as a substrate.

L-lysine is an extremely useful amino acid as an essential amino acid. Processes for producing L-lysine by fermentation have been known in the prior art. However, there have been no teachings or suggestions of producing L-lysine from ethyl alcohol (ethanol) as a substrate. Such a process would be most advantageous since ethyl alcohol is produced at low cost in the petroleum industry and is easy to handle in a culturing procedure. Moreover, ethyl alcohol possesses the advantage that it is soluble in water, in contradistinction to substances such as hydrocarbons which are insoluble in water, and it can be widely utilized by various microorganisms. With these factors in mind, the present inventors have investigated a process for producing L-lysine by fermentation from ethyl alcohol as a starting material, which investigation has led to the present invention.

Accordingly, one of the objects of the present invention is to provide an improved process for the production of L-lysine which overcomes the disadvantages and deficiencies of the prior art methods.

Another object of the present invention is to provide a process for producing L-lysine by fermentation which may be carried out in an efficacious and relatively simple manner.

A further object of the invention is to provide a process for producing L-lysine by fermentation which may be carried out advantageously on an industrial scale at low cost to give a high yield of product.

A still further object of the invention is to provide L-lysine.

These and other objects and advantages of the present invention will become apparent to those skilled in the art from a consideration of the following specification and claims.

As the result of examining the production of L-lysine by culturing various microorganisms in culture media containing ethyl alcohol as a substrate, it has been found, in accordance with the present invention, that bacteria belonging to the genera Corynebacterium, Brevibacterium, Arthrobacter, Bacillus and Nocardia are capable of producing L-lysine from ethyl alcohol in excellent yields. Accordingly, the microorganisms employed in the present invention are L-lysine-producing strains belonging to these genera and which have an ethyl alcohol-assimilatory property.

Either a synthetic culture medium or a natural nutrient medium is suitable for cultivation of the strains employed in the present invention as long as it contains the essential nutrients for the growth of the strain employed. Such nutrients are well known in the art and include substances such as a carbon source, a nitrogen source, inorganic compounds and the like which are utilized by the microorganism employed in appropriate amounts. As noted in the description hereinabove, ethyl alcohol is employed in the medium as the main source of carbon. Other sources of carbon may also be utilized in the medium and include substances such as, for example, carbohydrates such as glucose, fructose, maltose, sucrose, starch, starch hydrolysate, molasses, mannose, glycerol, etc., or any other suitable carbon source such as organic acids, for example, acetic acid, lactic acid, pyruvic acid, etc. These substances may be used either singly or in mixtures of two or more.

As a nitrogen source, various kinds of inorganic or organic salts or compounds, such as urea, liquid ammonia or ammonium salts such as ammonium chloride, ammonium sulfate, ammonium nitrate, ammonium acetate, ammonium phosphate, ammonium carbonate, etc., or natural substances containing nitrogen, such as cornsteep liquor, yeast extract, meat extract, peptone, fish meal, bouillon, casein hydrolysates, casamino acid, fish solubles, rice bran extract, defatted soybean cake, chrysalis hydrolysate, or various digestion substances thereof, may be employed. Again, these substances may be used either singly or in combinations of two or more.

Inorganic compounds which may be added to the culture medium include magnesium sulfate, sodius phosphate, potassium dihydrogen phosphate, potassium monohydrogen phosphate, iron sulfate, manganese chloride, calcium chloride, sodium chloride, zinc sulfate, manganese sulfate, calcium carbonate, etc.

If the microorganisms employed in the fermentation process of the present invention requires a particular nutrient for its growth, this should, of course, be added to the nutrient medium if it is not already contained in, for example, the nitrogenous organic substances present in the medium. Also, other growth factors, such as amino acids, vitamins such as thiamine, cobalamin, etc., or biotin may be added to the medium. It can thus be seen that the composition of the nutrient medium used in the present invention is the same as that generally used for the production of amino acids by fermentation.

The ethyl alcohol is added to the culture medium at the beginning of cultering or during the course of culturing, all at one time or intermittently, in an amount which does not inhibit the production of L-lysine. Preferably, the amount of ethyl alcohol added to the medium ranges between 10 g./l. and 200 g./l.

The conditions of culturing utilized are the same as those usually employed in amino acid fermentations. Thus, cultivation is conducted under aerobic conditions, such as aerobic shaking of the culture or with aeration and agitation of a submerged culture, at a temperature of, for example, about 20° to 40° C. and at a pH of, for example, about 5.5 to 9.5. The best results are obtained by maintaining the pH at about neutral (1.0) during culturing. Culturing is conducted under these conditions until L-lysine is produced in significant quantities in the resultant culture liquor, which generally takes about 30 to 150 hours.

After the completion of culturing, the L-lysine is recovered from the fermentation liquor by conventional means, such as ion exchange resin treatment, extraction with solvents, precipitation, adsorption, chromatography, concentration or the like. An especially suitable method is the ion exchange resin treatment described in Example 1 hereinbelow.

The following examples are given merely as illustrative of the present invention and are not to be considered as limiting. Unless otherwise noted, the percentages therein and throughout the application are by weight per liter of water. Exemplary microorganism strains advantageously employed in the present invention are described therein.

EXAMPLE 1

*Corynebacterium glutamicum* (*Micrococcus glutamicus*: Japanese Patent Publication 3698/57) ATCC 13287, an L-lysine-producing mutant, is used as the seed microorganism. This microorganism is inoculated into a 250 ml.-conical flask containing 20 ml. of a culture medium (pH 7.4) having the following composition:

15 ml./l.—ethyl alcohol
2.5 g./l.—urea
0.5 g./l.—$K_2HPO_4$
0.5 g./l.—$KH_2PO_4$
0.25 g./l.—$MgSO_4 \cdot 7H_2O$
0.01 g./l.—$FeSO_4 \cdot 7H_2O$
0.01 g./l.—$MnSO_4 \cdot 4H_2O$
50 μg./l.—biotin
10 g./l.—NZ-Amine (trademark for a casein-enzyme hydrolysate)
0.02 g./l.—phenol red Culturing is then carried out with aerobic shaking at 30° C. for 96 hours. During this cultivation, a mixture of three parts of ethyl alcohol and one part of 50% (w./v.) urea solution by volume is added to the medium 4 ml. at a time, four different times, with an indication of yellow in the coloring of the culture liquor because of the phenol red. The concentration of L-lysine in the resultant culture liquor after the completion of culturing is 8.4 mg./ml.

1.1 liters of the filtrate obtained by removing the microorganism cells from the cultured liquor is passed through a weakly basic anion exchange resin (Amberlite IRC-50), previously prepared to pH 7.0 with 0.5 M buffer solution, and the resin column is washed with water. Fractions containing L-lysine are gathered by elution with 0.15 N ammonia water, concentrated under reduced pressure, adjusted to an acidic pH (4.0), and further concentrated. As a result, 5.6 grams of crystals of L-lysine-monohydrochloride is obtained.

EXAMPLE 2

The L-lysine-producing mutant strain, *Brevibacterium ammoniagenes* ATCC 19350, is used as the seed microorganism. Culturing is conducted under the same conditions and in the same manner as described in Example 1, except that 5 mg./l. of thiamine is added to the fermentation medium of Example 1. The concentration of L-lysine in the cultured liquor after the completion of fermentation is 3.1 mg./ml.

EXAMPLE 3

The L-lysine-producing mutant, *Bacillus megaterium* KY 8110 (Bac-11) ATCC 21029, is used as the seed microorganism. This strain is inoculated into a conical flask containing 20 ml. of a culture medium containing the following components:

15 ml./l.—ethyl alcohol
20 g./l.—$(NH_4)_2SO_4$
0.5 g./l.—$K_2HPO_4$
0.5 g./l.—$KH_2PO_4$
0.25 g./l.—$MgSO_4 \cdot 7H_2O$
0.01 g./l.—$FeSO_4 \cdot 7H_2O$
0.01 g./l.—$MnSO_4 \cdot 4H_2O$
20 g./l.—$CaCO_3$
15 μg./l.—biotin
10 g./l.—NZ-Amine
100 mg./l.—meso-diaminopimelic acid
0.02 g./l.—phenol red Culturing is carried out with aerobic shaking at 30° C. for 96 hours. During cultivation, the pH of the medium is maintained at substantially neutral by adding a mixture of three parts of ethyl alcohol and one part of ammonia water by volume, 0.5 ml. at a time, as required, with an indication of yellow in the coloring of the phenol red. The concentration of L-lysine in the cultured liquor after the completion of fermentation is 2.3 mg./ml.

EXAMPLE 4

L-lysine-producing strains of various bacteria, shown in Table 1, are used as the seed microorganisms. Culturing is conducted under the same conditions and in the same manner as described in Example 3, except that a culture medium prepared by eliminating meso-diaminopimelic acid from the fermentation medium of Example 1 is used. The amounts of L-lysine accumulated in the resultant culture liquor after the completion of fermentation are shown in Table 1.

TABLE 1

Strains employed:

| | Amount of L-lysine produced (mg./ml.) |
|---|---|
| Arthrobacter paraffineus ATCC 21298 | 2.1 |
| Nocardia sp. ATCC 21337 | 2.7 |

The invention being thus described, it will be obvious that the same may be varied in many ways. Such variations are not to be regarded as a departure from the spirit and scope of the invention, and all such modifications as would be obvious to one skilled in the art are intended to be included herein.

We claim:

1. A process for producing L-lysine which comprises culturing an L-lysine-producing microorganism capable of assimilating ethyl alcohol and belonging to a genus selected from the group consisting of Corynebacterium, Brevibacterium, Arthrobacter, Bacillus and Nocardia under aerobic conditions in an aqueous nutrient medium containing ethyl alcohol as the main carbon-containing substrate, and accumulating L-lysine in the resultant culture liquor.

2. The process of claim 1, wherein culturing is carried out at a temperature of about 20° to 40° C. and at a pH of about 5.5 to 9.5.

3. The process of claim 2, wherein the pH is maintained at approximately 7.

4. The process of claim 1, wherein approximately 10 g./l. to 200 g./l. of ethyl alcohol is added to the medium.

5. The process of claim 4, wherein said ethyl alcohol is added to the medium at the initiation of culturing.

6. The process of claim 4, wherein said ethyl alcohol is added to the medium after the initiation of culturing.

7. A process for producing L-lysine which comprises culturing an L-lysine-producing microorganism capable of assimilating ethyl alcohol and belonging to a genus selected from the group consisting of Corynebacterium, Brevibacterium, Arthrobacter, Bacillus, and Nocardia under aerobic conditions at a temperature of about 20° to 40° C. and at a pH of about 5.5 to 9.5 in an aqueous nutrient medium containing ethyl alcohol as the main carbon-containing substrate, accumulating L-lysine in the resultant culture liquor, and recovering said L-lysine therefrom.

8. The process of claim 7, wherein said microorganism is Corynebacterium glutamicum ATCC 13287.

9. The process of claim 7, wherein said microorganism Brevibacterium ammoniagenes ATCC 19350.

10. The process of claim 7, wherein said microorganism is Bacillus megaterium ATCC 21029.

11. The process of claim 7, wherein said microorganism is Arthrobacter paraffineus ATCC 21298.

12. The process of claim 7, wherein said microorganism is Nocardia sp. ATCC 21337.

References Cited
UNITED STATES PATENTS 3,212,994 10/1965 Kono et al. _____ 195—29

LIONEL M. SHAPIRO, Primary Examiner

S. RAND, Assistant Examiner

U.S. Cl. X.R.

195—29

UNITED STATES PATENT OFFICE
CERTIFICATE OF CORRECTION

Patent No. 3,595,751           Dated July 27, 1971

Inventor(s) Kiyoshi NAKAYAMA, Sagamihara-shi, and Hiroshi HAGINO, Hachioji-shi, Japan It is certified that error appears in the above-identified patent and that said Letters Patent are hereby corrected as shown below:

Column 3, line 74, "ATCC 21029" should be changed to read --ATCC 21209--. Column 5, line 12, "ATCC 21029" should be changed to read --ATCC 21209--.

Signed and sealed this 4th day of July 1972.

(SEAL)
Attest:

EDWARD M. FLETCHER, JR.
Attesting Officer

ROBERT GOTTSCHALK
Commissioner of Patents